United States Patent

[11] 3,632,253

[72] Inventor Robert Tillis
    Edison, N.J.
[21] Appl. No. 3,344
[22] Filed Jan. 16, 1970
[45] Patented Jan. 4, 1972
[73] Assignee Rheem Manufacturing Company

[54] PRESSURE-RESPONSIVE SHAFT SEAL FOR PLASTIC MATERIALS EXTRUDERS
9 Claims, 6 Drawing Figs.

[52] U.S. Cl. .................................................. 425/168,
    425/200, 425/376, 425/207
[51] Int. Cl. ................................................. B29f 3/01
[50] Field of Search ........................................ 18/12 SM,
    12 SA, 12 SV, 12 SZ, 30 SS, 30 SM, 30 SR

[56] References Cited
UNITED STATES PATENTS
3,357,049  12/1967  Spindler .......................  18/12 SA
3,188,691  6/1965  Stenger .......................  18/30 SS

*Primary Examiner*—J. Spencer Overholser
*Assistant Examiner*—Norman E. Lehrer
*Attorney*—Sperry and Zoda ABSTRACT: Axial thrust force on the feed screw of a plastic materials extruder increases in proportion to the increase of pressures developing within the discharge chamber of the extruder, to produce a proportionate increase in the sealing force developed between a stationary seal plate, and a rotary seal plate secured to the feed screw shaft. The seal takes up automatically for wear. An interchange of seal plates is provided to control the rate of escape of materials through the seal. Prepositioning of the feed screw shaft in the axial direction is also provided, to adjustably predetermine the seal space dimension between the plates.

INVENTOR
ROBERT TILLIS

BY Sperry and Zoda
ATTORNEYS

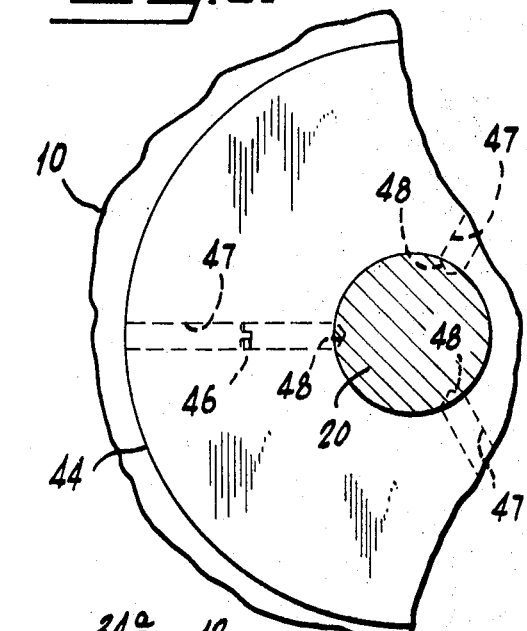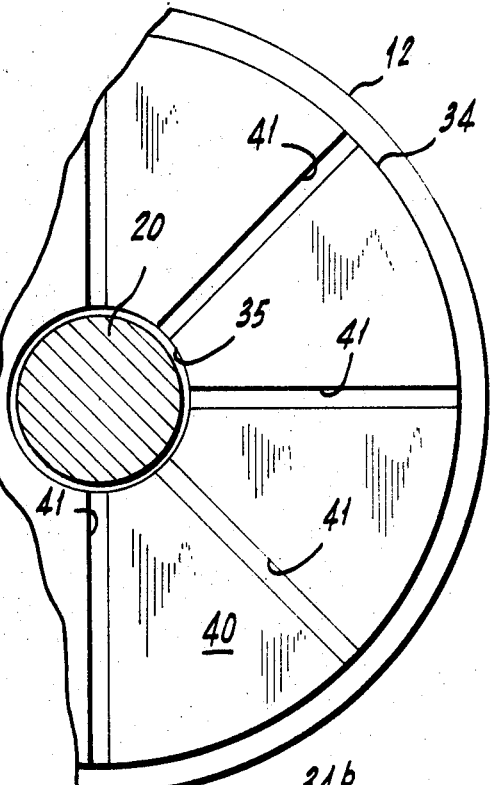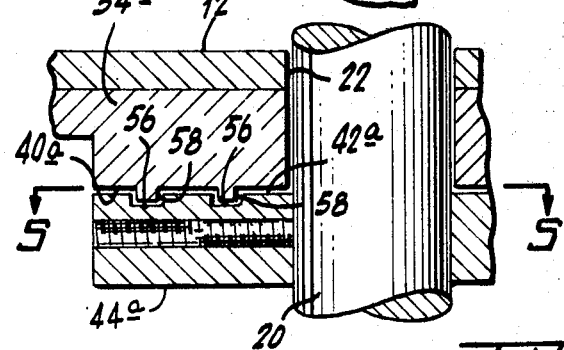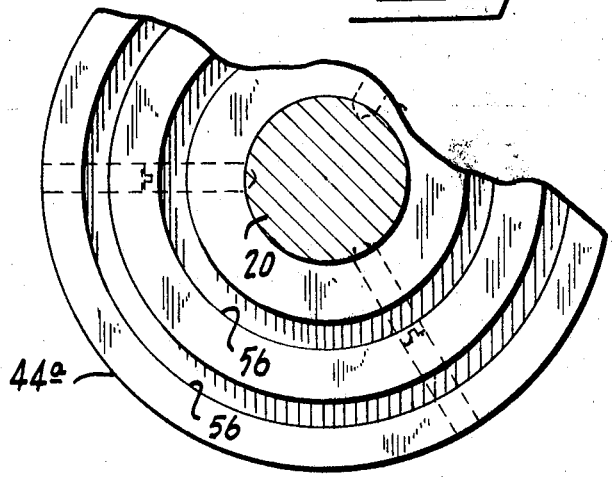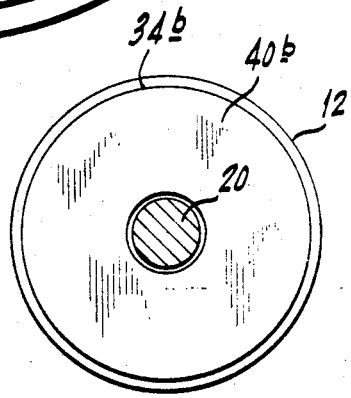

3,632,253

PRESSURE-RESPONSIVE SHAFT SEAL FOR PLASTIC MATERIALS EXTRUDERS

BACKGROUND OF THE INVENTION

1. Field of the Invention

The invention pertains to the plastics art and has particular application to molding devices of the die-expressing type. Specifically, the invention relates to shaft seals for such devices, especially front end drive extruders in which a vertical feed screw shaft advances materials toward a side discharge outlet located proximate the shaft drive mechanism.

2. Description of the Prior Art

Prior U.S. Pats. Nos. 3,278,986 dated Oct. 18, 1966, and 3,416,189 dated Dec. 17, 1968, both issued to Benjamin P. Welt, disclose extrudes of the type to which the present invention has particular applicability. An extruder made according to either of these patents utilizes a vertical barrel in which a feed screw is rotated by a drive means disposed at the lower end of the structure. Materials are deposited in a hopper at the upper end of the barrel, and are advanced by the feed screw while being subjected to high heat. The resultant melt is forced under pressure through an expressing die attached to a side discharge opening provided at the lower end of the barrel.

As discussed in U.S. Pat. 3,416,189, a troublesome and persistent problem in devices of this type has to do with the maintenance of an effective seal where the shaft bears in the barrel end down stream from the discharge port. The materials extruded by devices of the type described are highly abrasive, vary widely in viscosity, are highly sensitive to heat, and subject to rapid decomposition, often to a hard, crystalline state.

U.S. Pat. No. 3,416,189 relates to a shaft seal that takes account of conditions of this type. The features of the construction set forth in that patent are accurately and validly stated. However, despite the lubricity of plastic material, a finite rate of wear constantly changes the dimensions of both the screw and the barrel and increases the clearance between these two components of the extrusion apparatus. When materials containing abrasive compounds are used, the rate of wear is sharply accelerated. As the clearance between the barrel and the screw increases, the leakage of plastic through the seal increases in proportion.

This continuous increase in leakage is a highly undesirable condition, and an important aim would be the provision of a structure that automatically will produce a controlled leakage that is automatically held at a constant rate, despite the progressively increasing clearance between the screw and barrel.

There are several other circumstances, normal to the operation of extruders of this type, that will also increase or change the leakage rate through the shaft seal, even when the machine is quite new. Among these are screw speed (selected according to the characteristics of the materials being extruded, the temperatures applied thereto, etc.), viscosity differences in the materials, and varying back pressures translated into correspondingly varying axial thrust forces on the feed screw.

The problem, thus, is to prevent progressively increasing rates of leakage or escape of the plastic materials through the shaft seal. The present invention is addressed to the solution of this problem, and accomplishes the solution through means that will automatically keep the rate of leakage constant, at a predetermined value that can be adjustably established in the machine before use.

SUMMARY OF THE INVENTION

In the present invention, a feed screw rotates in a vertical barrel, that extends upwardly from a gear box into which the lower end of the feed screw extends. A drive gear within the gear box rotates the feed screw at the desired speed, in a direction such that materials fed into the upper end of the barrel will be forced under pressure, in a melted state, through a side discharge orifice to which a conventional expressing die of any suitable design is attached.

Below the discharge or expressing chamber communicating with the orifice, the shaft extends through a fixed seal plate, disposed in confronting relation to a rotary plate interchangeably secured to the shaft for rotation therewith. The shaft is mounted in the drive mechanism for axial sliding movement while still being maintained in driving-driven relationship therewith, so that when high pressures develop in the discharge chamber during normal operation, said pressures will be translated into axial thrust on the shaft, tending to shift it axially in respect to the drive mechanism, in a direction such as to advance the rotary seal plate into sealing relation with the fixed seal plate.

Since the shaft is permitted axial motion over a distance greater than the space between the seal plates, there is an automatic takeup for wear, an automatic adjustment to take viscosity differences into account, and an automatic increase in sealing force or pressure between the plates, proportionate to increases in axial thrust forces exerted upon the shaft whether said thrust forces be the result of higher screw speed, higher pressures developing in the discharge chamber, or both.

One or both of the seal plates may be interchangeable, to provide different seal face areas according to the controlled, constant flow rate desired or other operational factors. Additionally, the seal faces may be grooved or ribbed to control flow rates of material therethrough, and adjustable prepositioning of the shaft (and hence of the rotary seal plate) may be utilized as a further control upon the materials escape rate.

BRIEF DESCRIPTION OF THE DRAWING

FIG. 2 is a sectional view on line 2—2 of FIG. 1;

FIG. 3 is a sectional view substantially on line 3—3 of FIG. 1;

FIG. 4 is a fragmentary longitudinal sectional view taken diametrically through a modified construction;

FIG. 5 is a sectional view substantially on line 5—5 of FIG. 4; and

FIG. 6 is a reduced transverse sectional view on the same cutting plane as FIG. 3, looking upwardly at the fixed seal plate, showing another modification.

DESCRIPTION OF THE PREFERRED EMBODIMENTS

Figure 1:
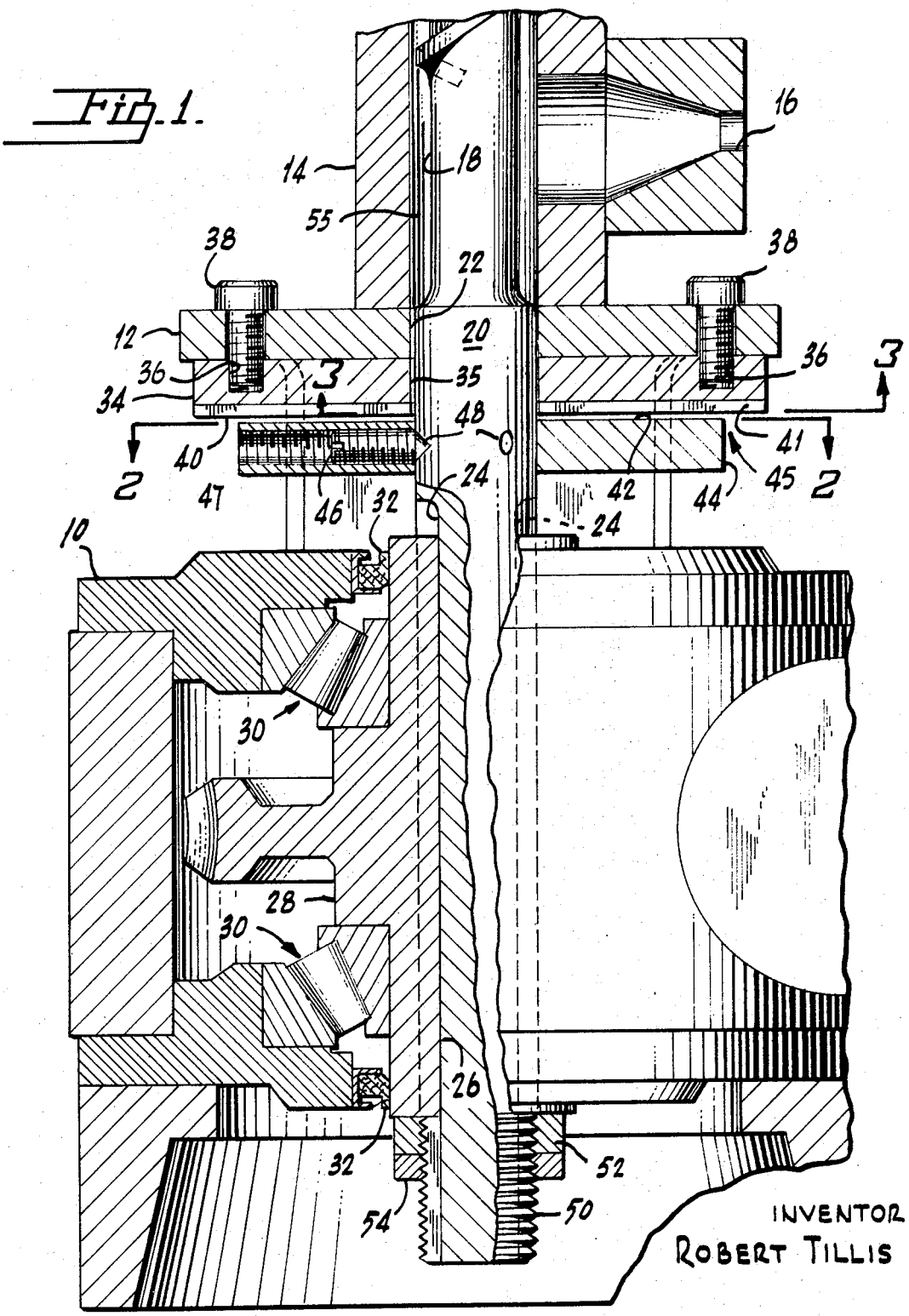
FIG. 1 is a fragmentary view, partly in longitudinal section and partly in side elevation, of the lower end of an extruder provided with a shaft seal according to the present invention.

Designated at 10 is a gear box the housing of which is integral or otherwise made rigid with an open support frame 12 extending upwardly from the gear box. An elongated, vertical barrel 14 is rigid with an extends upwardly from the support frame. The barrel, adjacent its lower end, has a side discharge port 16, to which any suitable conventional expressing die, not shown, may be attached. An elongated feed screw 18 rotates within the barrel, and at its lower end has an axial extension 20 extending downwardly through the clearance opening 22 provided in support frame 12, which as shown constitutes a lower or front end wall of the barrel.

Axial extension 20 of the shaft extends downwardly through the gear box, and has diametrically opposed, dual keyways 24, receiving keys 26 of a drive gear 28 supported in a constant plane by bearings 30. At the upper and lower ends of the gear box, conventional oil seals 32 are provided providing a seal between the drive gear hub ends and the top and bottom walls of the gear box.

Drive gear 28 would be driven by a suitable worm gear or the like, not shown, or any other suitable reducing gear mechanism. As will be noted, the construction provides for a driving connection between gear 28 and shaft extension 20, such that although the gear remains in a constant plane, the shaft is axially slidable in respect to the gear, while being driven thereby. Except for this feature, the construction so far described is like that shown in the above named patents.

In accordance with the present invention, a fixed, circular seal plate 34, concentric with shaft extension 20, is provided and in the illustrated example is secured directly to the underside of the horizontal top wall of frame structure 12. Any suitable means can be employed to secure the fixed plate to said frame structure, and in some instances, the fixed or stationary plate can even be made integral with the frame structure. In the illustrated example, threaded recesses 36 are angularly, uniformly spaced about the circumference of the plate 34, receiving connecting screws 38 that extend through clearance holes of the frame structure 12.

Formed centrally in the plate 34 is a clearance opening 35 for the shaft extension 20, through which plastic materials are permitted to flow to the seal face 40 of the plate 34.

In FIG. 1, the seal face is formed with uniformly, angularly spaced, radial escape grooves 41 (see FIG. 3.), providing for a controlled leakage or escape of materials entering the space between the seal face 40 of stationary seal plate 34, and confronting seal face 42 of a rotary seal plate 44.

At this point, it will be noted that the vertical or axial dimension of the seal space 45 defined between plates 34,42 has been exaggerated in the drawing for the purpose of illustration, this being true also of the flow space defined between the surface of shaft extension 20 and the walls of clearance openings 22,35.

The rotary seal plate is also of circular form, and can be of any desired diameter. In the illustrated example, it is slightly smaller in diameter in FIG. 1, than the fixed plate 34, however, it could be of the same, or in some instances of larger diameter than the fixed plate.

The rotary seal plate has its seal face 42 in parallel, confronting relation to the seal face 40 of the stationary plate, so as to produce therebetween the seal space 45, the dimension of which measured axially of shaft extension 20 will be varied according to the axial displacement of the feed screw.

The rotary seal plate is removably attached to shaft extension 20 for rotation therewith, and in the present instance, this is accomplished through the provision of three, uniformly, angularly spaced radial bores 47 threaded to receive setscrews 46 the inner ends of which engage in recesses 48 of the shaft extension 20. Other means can be employed for attaching the rotary seal plate to the feed screw, it being mainly important that the plate be secured to the shaft for rotation therewith, at an arbitrary point on the shaft in respect to the fixed plate.

The invention also embraces the concept of a preadjustment of the feed screw, in an axial direction, thus to preadjust the position of the rotary plate in respect to the fixed plate. This, of course, predetermines the dimension of the seal space 45, measured axially of the shaft.

To this end, the shaft is provided at its lower end with a threaded extension 50, receiving an adjusting nut 52 bearing against the lower end of the hub of the drive gear 28. By rotation of the nut 52, the feed screw can be adjusted axially, and after such adjustment a lock nut 54 is utilized to preserve the adjustment.

In use, plastic materials will be fed into the barrel 14, and will be forced under pressure, in a melted state, through the discharge orifice 16. Under these circumstances, high pressure is developed within the discharge or expressing chamber 55 of the barrel, communicating with the side discharge opening. In the Welt U.S. Pat. No. 3,278,986, a construction was disclosed to minimize axial thrust exerted upon the feed screw resulting from such high pressures within the discharge chamber. Such thrust, when developed, tends to shift the feed screw upwardly in FIG. 1, as discussed in full detail in U.S. Pat. No. 3,278,986. That patent, though minimizing axial thrust, does not claim to eliminate it completely, and the axial thrust that does still exist is utilized in the present invention to create the desired sealing force.

This occurs by reason of the fact that proportionate to the value of the pressure within the discharge chamber 55, axial thrust forces will be exerted upon the shaft. The value of said force will be initial to the amount of pressure within the discharge chamber, so that the greater the pressure, the greater will be the axial thrust upon the shaft tending to displace it upwardly in FIG. 1.

The result is that the rotary seal plate 44 is carried upwardly with the shaft, to create a sealing force between the faces 40, 42. In other words, when the axial thrust is exerted on the shaft, the space 45 will be diminished in the sense of the axial direction to create the desired sealing action.

It will be appreciated that the value of the sealing force is proportionate, in the final analysis, to the amount of pressure within the discharge chamber 55.

In some instances, different shaft speeds are required according to the nature of the particular materials being extruded. It is known, in this regard, that the higher the shaft speed, the greater the axial thrust on the shaft tending to displace it upwardly. This, in turn, is another condition which tends to create the sealing force between faces 40, 42.

Other factors that affect the amount of pressure within chamber 55 are wear of the parts, and viscosity differences between materials extruded.

It will be observed, in this regard, that is is a part of the invention that there be a controlled escape or leakage of the materials through the openings 22, 35 and space 45. The essence of the invention, however, is that this controlled leakage or flow rate remains constant despite increasing wear between the shaft and barrel, changing pressures in the discharge chamber 55, higher screw speeds, and high viscosities.

The reason the flow rate remains constant is that wear on either or both of the seal plates is automatically taken up by the upward movement of the screw, acted upon by the axial thrust force, and opposed by movement of the rotary seal plate 44 against the stationary seal plate 34.

Another reason why the flow rate remains constant is that higher pressures within discharge chamber 55 proportionately increase thrust forces exerted upon the shaft, thus to increase the sealing force against the material seeking escape under the higher pressures. In other words, the higher the pressure in the discharge chamber, the higher should be the sealing force, and this is automatically brought about by the construction illustrated and described. It is true, also, that the higher the screw speed, the greater would be the normal flow rate. In the present instance, the higher the speed of rotation of the screw, the greater will be the seal force between the plates, and therefore, once again the flow rate will be kept constant despite the higher screw speed.

It may be noted, at this point, that lower viscosity materials do result in lower thrust forces, but the material is more easily impinged, and hence is more readily sealable. Thus, the lower viscosity materials do not require as great a sealing force, and therefore, the sealing action is still kept constant and fully effective despite the relatively low axial thrust force exerted upon the shaft. The seal, thus, is pressure responsive, to provide an automatically constant leakage rate of materials through the seal, despite increasing wear of the parts, changing screw speeds, different material viscosities, etc.

It is also to be noted that prior to operation of the extruder, the feed screw position can be adjusted axially by means of the nut 52. Therefore, the space 45 is adjusted in this way, so that when the device goes into operation, the rotary seal plate can be moved toward the fixed seal plate only a prescribed distance, leaving a space 45 of selected, predetermined dimensions.

Thus, once the rate of leakage is selected, it remains constant thereafter during operation.

The radial escape grooves 41 in FIG. 1 illustrate one expedient for providing for a controlled escape of materials between the seal faces. In FIGS. 4 and 5 there is shown another arrangement. In this arrangement, the rotary seal plate 44a has a seal face 42a in opposition to the seal face 40a of fixed seal plate 34a. In this arrangement, the rotary plate has a series of continuous, annular, concentric grooves 56 receiving ribs 58 of corresponding form provided upon the seal face 40a.

The provision of the ribs and grooves defines a tortuous path through which the escaping materials must flow, thus producing a controlled leakage between the seal faces. This, as noted above, will remain constant during operation by reason of the operational characteristics of the construction previously discussed herein.

In FIG. 6, there is illustrated, on a reduced scale, the seal face 40b of a modified fixed seal plate 34b. This seal face is completely flat and unbroken, and has been illustrated to show the capability of the invention for operation in the absence of escape grooves 41 or the mating ribs and grooves 56,58. Though said grooves and ribs are believed to represent a novel, desirable feature of importance, the invention is still such, in basic concept, as to permit satisfactory operation even when the seal faces are left completely fat and unbroken.

I claim:

1. In a plastic materials extruder of the side discharge type including a feed screw having a shaft drive means for rotating the shaft, a barrel in which the shaft rotates, said barrel having a side discharge port and a communicating discharge chamber in which a high pressure condition is developed tending to exert an axial thrust on the shaft, an improved, pressure-responsive shaft seal utilizing said high-pressure condition to develop sealing forces proportionately to the level of the pressure in said chamber, comprising:
    a. a stationary seal plate having a seal face and a clearance opening through which said shaft extends;
    b. said shaft being arranged within said clearance opening to define a generally annular space;
    c. a rotary seal plate attached to the shaft for rotation therewith and having a seal face in spaced, confronting relation to the seal face of the stationary plate;
    d. said seal face of said stationary seal plate cooperating with said seal face of said rotary seal plate to define an escape path for the passage of plastic materials flowing from said annular space to a point remote from said extruder; and
    e. means mounting the shaft for movement in response to said axial thrust in a direction to shift the rotary plate toward the stationary plate, over an axial distance at least equal to the space between the seal faces measured axially of the shaft, to create a sealing force between the plates proportional to the value of the axial thrust forces exerted upon the shaft.

2. A shaft seal as in claim 1 wherein said drive means comprises a reducing gear box including a drive gear for the shaft, said shaft being slidably engaged with said drive gear for travel through at least said distance while being maintained in driving-driven relationship therewith whereby to mount the shaft for said axial movement responsive to the axial thrust forces exerted thereagainst.

3. A shaft seal as in claim 1 in which at least one of said plates is removably mounted to provide for a selective interchange of plates differing in respect to the seal face areas thereof.

4. A shaft seal as in claim 1 in which said seal faces have flat, continuous surfaces in planes normal to the axis of the shaft.

5. A shaft seal as in claim 1 wherein at least one of said faces is formed with a series of material escape grooves extending from the shaft to the circumference of the plate.

6. A shaft seal as in claim 1 wherein at one of said faces is formed with a series of annular grooves concentric with the shaft.

7. A shaft seal as in claim 1 wherein said faces are formed with mating, annular ribs and grooves.

8. A shaft seal as in claim 2 further including means to prelocate the shaft and rotary plate in an axial direction to selectively adjust the spacing between said seal faces when the shaft is shifted by the forces of said axial thrust.

9. A shaft seal as defined in claim 8 wherein said means for prelocating the shaft and rotary plate comprises a threaded extension on the shaft, and a nut threadedly engaged with said extension and bearing against an adjacent portion of the extruder, whereby said means for prelocating the shaft is operative to slidably adjust the shaft within the drive gear in response to rotation of the nut preliminary to operation of the extruder.

* * * * *